BEAN & WRIGHT.
Straw Cutter.
No. 23,890.
Patented May 10, 1859.
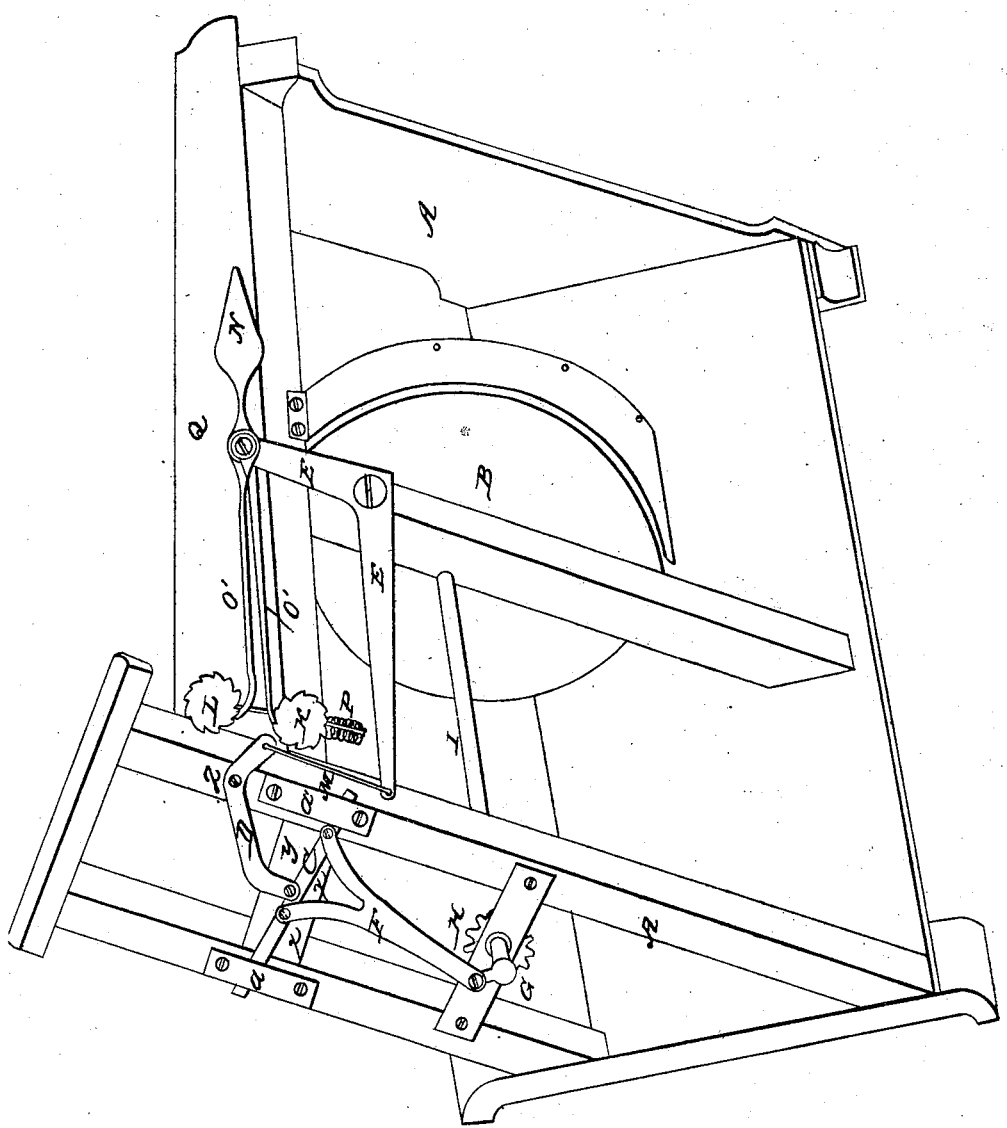

UNITED STATES PATENT OFFICE.

JOHN BEAN AND BENJN. WRIGHT, OF HUDSON, MICHIGAN.

STRAW-CUTTER.

Specification of Letters Patent No. 23,890, dated May 10, 1859.

*To all whom it may concern:*

Be it known that we, JOHN BEAN and BENJAMIN WRIGHT, of the town of Hudson, county of Lenawee, and State of Michigan, have invented a new and Improved Mode of Making Straw-Cutters; and we do hereby declare that the following is a full and exact description thereof, reference being had to the accompanying drawings and references marked thereon.

The nature of the invention consists in an arrangement of the knife worked by the forked pitman to perform two functions at the same time, namely to cut the straw and operate the feed rollers by means of a crooked lever and a rock-shaft in a manner now to be explained.

The drawing which accompanies this description and makes part of the same represents a straw cutter having also a corn sheller operated by the same power and arranged within the same frame although the sheller does not form any part of the present claim.

A, A, represent the frame work of the machine; B, the sheller, and regulator of motion; C, the knife held in place by the plates $a$, $a'$; D, the crooked lever communicating motion from the knife to the rock shaft and thence to the feed rollers; E, the rockshaft; F, the forked pitman that receives its motion from the driving power through the crank G.

H, is the pinion on the shaft I and meshes into another pinion set at right angles with it, but not shown in the drawing.

K and L are the feed rollers.

M is the rod that connects the lever D with rock shaft E.

N is the weight which retains pawl O in its place. O' is kept in place by its own weight.

P is a spiral spring which allows the roller L to rise and fall but at the same time causes it to press down upon the feed in the hopper, Q.

Operation: The hopper being supplied with suitable straw for the work, power is applied to the pinion H, from any proper source, which turns the crank G, and moves the pitman F, connected thereto, which brings down the knife C, upon the sharp edge of the fixed cutter $x$, $x$, and severs the protruding straws which enter through the opening, $y$. The descent of the knife C, brings down the nearest end of the crooked lever D, pivoted at, $z$, and raises the opposite end, and at the same time throws back arm E', withdrawing pawls O, and O'.

The parts are so arranged that while the knife is performing its cut the pawls are being drawn back to take new hold; and in the other half of the revolution of the crank, the pawls O, and O', push forward the feed rollers K and L which causes the straw to protrude again through the opening $y$. Thus the power required to drive the machine is pretty well equalized, by so arranging the work that the cut of the straw is performed in the first half of the revolution of the crank, while the feeding is done in the second half of the revolution, or when the knife is rising after it has done its heaviest work.

The sheller B in this machine performs the functions of the balance wheel and preserves the motion of the machine uniform and steady.

Now we are aware that none of the individual devices herein described is new by itself; nor is it new to connect a corn sheller with a straw cutter, or to use the said sheller as a balance power. The forked pitman and knife have also been worked together. But so far as we know, the knife has not been used to give motion to the feed rollers through the lever D and the rockshaft E as done by us. This device for transmitting power from the knife to the rollers as described, and especially when that is used to control and equalize the motion of the knife in the two halves of the revolution of the crank does present a feature of novelty peculiar to our machine.

Having fully described the nature of our invention in straw cutters, and the mode of using the same what we claim as our invention and desire to secure by Letters Patent is—

The arrangement and combination of the knife C, lever D, and rock shaft E substantially in the manner and for the purpose herein set forth.

JOHN BEAN.
BENJAMIN WRIGHT.

In presence of:
A. C. MERCER,
J. M. WIRTS.